United States Patent
Yang et al.

(10) Patent No.: US 9,216,562 B2
(45) Date of Patent: Dec. 22, 2015

(54) ALIGNMENT FILM MATERIAL AND MANUFACTURING METHOD FOR LIQUID CRYSTAL DISPLAY PANEL

(71) Applicant: Shenzhen China Star Optoelectronics Technology Co., Ltd., Shenzhen, Guangdong (CN)

(72) Inventors: Kunchang Yang, Shenzhen (CN); Liang Xu, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 225 days.

(21) Appl. No.: 14/233,379

(22) PCT Filed: Oct. 22, 2013

(86) PCT No.: PCT/CN2013/085705
§ 371 (c)(1),
(2) Date: Jan. 16, 2014

(87) PCT Pub. No.: WO2015/043029
PCT Pub. Date: Apr. 2, 2015

(65) Prior Publication Data
US 2015/0083308 A1    Mar. 26, 2015

(30) Foreign Application Priority Data
Sep. 25, 2013  (CN) .......................... 2013 1 0443378

(51) Int. Cl.
C09D 179/08    (2006.01)
C08G 73/10    (2006.01)
B32B 37/26    (2006.01)

(52) U.S. Cl.
CPC ............ B32B 37/26 (2013.01); C08G 73/1042 (2013.01); C08G 73/1067 (2013.01); C09D 179/08 (2013.01)

(58) Field of Classification Search
CPC .. B32B 37/26; C09D 179/08; C09G 73/1042; C09G 73/1067
See application file for complete search history.

(56) References Cited

U.S. PATENT DOCUMENTS 6,538,712 B1 *  3/2003  Winker ................ G02B 5/3016
                                                                349/117

* cited by examiner

*Primary Examiner* — Jeff Aftergut
(74) *Attorney, Agent, or Firm* — Andrew C. Cheng

(57) ABSTRACT

The present invention discloses an alignment film and the manufacturing method for liquid crystal display panel. The method comprises preparing a first substrate, a second substrate and a liquid crystal, at least one of the first substrate and the second substrate being provided with an alignment film; the material of the alignment film comprising a solvent and a substance dissolved in the solvent, the substance comprising at least one first polymer, the first polymer comprising a main chain and a side chain; folding the first substrate and the second substrate, and injecting the liquid crystal between the first substrate and the second substrate to form a liquid crystal cell; applying voltage to the liquid crystal cell, and then irradiating the liquid crystal cell with UV light. Through the above way, the present invention can reduce the mura phenomenon in the liquid crystal display panel and improve the display quality.

15 Claims, 2 Drawing Sheets

S101: preparing a first substrate, a second substrate and a liquid crystal, at least one of the first substrate and the second substrate being provided with an alignment film, the material of the alignment film comprising a solvent and a substance dissolved in the solvent, the substance comprising at least one first polymer, the first polymer comprising a main chain and a side chain connected to the main chain, part of the side chain comprising an alkyl group with a predetermined length, the end of the alkyl group comprising a cyclohexenyl group, the para- or meta- position of the cyclohexenyl group comprising a sterically hindered functional group, so that the side chain has the property of forming stable vertical alignment S102: folding the first substrate and the second substrate, and injecting the liquid crystal between the first substrate and the second substrate to form a liquid crystal cell, the alignment film being provided adjacent to the liquid crystal, the side chain having the property of forming stable vertical alignment, so that the liquid crystal molecules of the liquid crystal is under the state of vertical alignment S103: applying voltage to the liquid crystal cell, and then irradiating the liquid crystal cell with UV light, so that the liquid crystal molecules of the liquid crystal become predetermined orientation from vertical alignment

FIG. 1

ALIGNMENT FILM MATERIAL AND MANUFACTURING METHOD FOR LIQUID CRYSTAL DISPLAY PANEL

BACKGROUND OF THE INVENTION

1. Field of the Invention

The present invention relates to the field of liquid crystal display technology, and in particular to an alignment film and the manufacturing method for liquid crystal display panel.

2. the Related Arts

The development of information society increases the demand towards the display devices. In order to meet this demand, a lot of flat panel display devices, such as liquid crystal display (LCD), plasma display (PDP), OLED display, etc., have been developed rapidly. Among all of the flat panel display, liquid crystal display device is gradually replacing the cold cathode display device due to its low weight, small size and low power consumption.

For the vertical alignment display mode, a liquid crystal display device is mainly composed of the two substrates and, negative liquid crystal molecules embedded between two substrates visualized as a biscuit. The characteristic of multi-domain vertical alignment mode (MVA) is forming rib with a certain shape at the color film side. Patterned vertical alignment mode (PVA) does not need to form the rib at the color film, but it forms the corresponding ITO slit on the transparent conducting oxide at the color film side. However, in the above two techniques, the transmittance of rib and ITO slit is much smaller than that of the normal pixel area, which would affect the transmittance of the overall product. The advantage of polymer sustained vertical alignment (PSVA) is that reactive monomer is added into the negative liquid crystal. These reactive monomers will react according to a certain law through the external influences. Transparent electrode with smaller width and transparent ITO slit are used on the side transparent electrode array pattern.

The display modes mentioned above have its own characteristics, and it was widely produced. But the transmittance of rib and ITO slit is much smaller than the transmittance of the normal pixel area, which would affect the transmittance of the overall product. For PSVA display mode, the reactive monomer is not only expensive, but also it can form dropping mura easily with the one drop fill (ODF) process, which mainly refers to low contrast, uneven brightness, and surface area greater than one pixel defects. At the same time, different batches of liquid crystal material have more or less different concentration of reactive monomer during mass production, which would form the display mura on the final product easily. During the photo-alignment process, the liquid crystal cell at particular position will react very fast, forming some large reactants and resulting in broken light issues.

SUMMARY OF THE INVENTION

The technical issue to be solved by the present invention is to provide an alignment film and the manufacturing method for liquid crystal display panel, which can reduce the mura phenomenon in the liquid crystal display panel and improve the display quality.

In order to solve the technical issue, the embodiment according to the present invention provides an alignment film material used for liquid crystal display panel, the alignment film material comprises a solvent and a substance dissolved in the solvent; the substance comprising at least one first polymer, the first polymer comprising a main chain and a side chain connected to the main chain, part of the side chain comprising an alkyl group with a predetermined length, the end of the alkyl group comprising a cyclohexenyl group, the para- or meta-position of the cyclohexenyl group comprising a sterically hindered functional group, so that the side chain has the property of forming stable vertical alignment, the sterically hindered functional group being selected from alkyl group, aryl group and heterocyclic ring, the main chain being a second polymer, the second polymer being selected from polyimide and polyimide acid, the solvent being selected from the group consisting of N-methyl pyrrolidone and diethylene glycol monobutyl ether.

Wherein, the alkyl group is selected from t-butyl group and cyclohexane, the aryl group is phenyl ring.

Wherein, the main chain is a third polymer, the third polymer is a polymer composed of 3,4'-dicarboxy-4,3' amide biphenyl and 3,4,3',4-biphenyl tetracarboxylic.

In order to solve the technical issue, another embodiment according to the present invention provides an alignment film material used for liquid crystal display panel, the alignment film material comprising a solvent and a substance dissolved in the solvent; the substance comprising at least one first polymer, the first polymer comprising a main chain and a side chain connected to the main chain, part of the side chain comprising an alkyl group with a predetermined length, the end of the alkyl group comprising a cyclohexenyl group, the para- or meta-position of the cyclohexenyl group comprising a sterically hindered functional group, so that the side chain has the property of forming stable vertical alignment.

Wherein, the sterically hindered functional group is selected from alkyl group, aryl group and heterocyclic ring.

Wherein, the alkyl group is selected from t-butyl group and cyclohexane, the aryl group is phenyl ring.

Wherein, the main chain is a second polymer the second polymer is selected from polyimide and polyimide acid.

Wherein, the main chain is a third polymer, the third polymer is a polymer composed of 3,4'-dicarboxy-4,3' amide biphenyl and 3,4,3', 4'-biphenyl tetracarboxylic.

Wherein, the solvent is selected from the group consisting of N-methyl pyrrolidone and diethylene glycol monobutyl ether.

In order to solve the technical issue, another embodiment according to the present invention provides an manufacturing method for liquid crystal display panel, comprising: preparing a first substrate, a second substrate and a liquid crystal, at least one of the first substrate and the second substrate being provided with an alignment film, the material of the alignment film comprising a solvent and a substance dissolved in the solvent, the substance comprising at least one first polymer, the first polymer comprising a main chain and a side chain connected to the main chain, part of the side chain comprising an alkyl group with a predetermined length, the end of the alkyl group comprising a cyclohexenyl group, the para- or meta-position of the cyclohexenyl group comprising a sterically hindered, functional group, so that the side chain has the property of forming stable vertical alignment, which further controls the liquid crystal molecules of the liquid crystal under the state of vertical alignment; folding the first substrate and the second substrate, and injecting the liquid crystal between the first substrate and the second substrate to form a liquid crystal cell, the alignment film being provided adjacent to the liquid crystal, the side chain having the property of forming stable vertical alignment, so that the liquid crystal molecules of the liquid crystal is under the state of vertical alignment; applying voltage to the liquid crystal cell, and then irradiating the liquid crystal cell with UV light, so that the liquid crystal molecules of the liquid crystal becomes predetermined orientation from vertical alignment.

Wherein, the sterically hindered functional group is selected from alkyl group, aryl group and heterocyclic ring.

Wherein, the alkyl group is selected from t-butyl group and cyclohexane, the aryl group is phenyl ring.

Wherein, the main chain is a second polymer, the second polymer is selected from polyimide and polyimide acid.

Wherein, the main chain is a third polymer, the third polymer is a polymer composed of 3,4'-dicarboxy-4,3' amide biphenyl and 3,4,3', 4'-biphenyl tetracarboxylic.

Wherein, the solvent is selected from the group consisting of N-methyl pyrrolidone and diethylene glycol monobutyl ether.

The present invention has the beneficial effects as follow. To distinguish with the situation of the prior art, in the alignment film material according to the present invention, part of side chain of the first polymer comprises an alkyl group with a predetermined length, the end of the alkyl group comprises a cyclohexenyl group, the para- or meta-position of the cyclohexenyl group comprises a sterically hindered functional group, so that the side chain has the property of forming stable vertical alignment. Therefore, when using the alignment film material according to the present invention, only the alignment film is required to allow the liquid crystal molecules forming stable vertical alignment. Comparing with the prior art, the reactive monomer is not needed to add, which can avoid the mura defects from the reactive monomer. At the same time, the side chain acts as the following reactive group and be fixed on the main chain of the alignment film. The concentration of the reactive group will not become uneven due to reaction. Therefore, it can reduce the generation of the small bright dots and improve the display quality of the products.

BRIEF DESCRIPTION OF THE DRAWINGS

FIG. 1 is a flow chart of the manufacturing method for liquid crystal display panel according to an embodiment of the present invention.

DETAILED DESCRIPTION OF THE PREFERRED EMBODIMENTS

Figure 2:
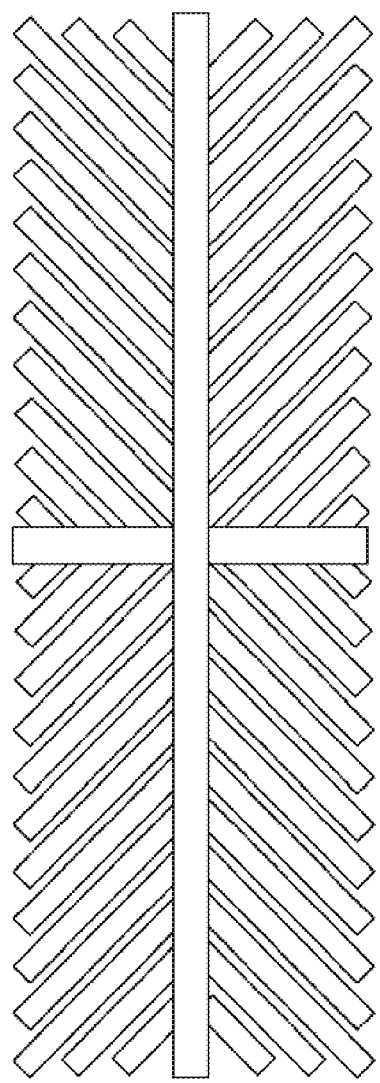
FIG. 2 is a schematic view illustrating the arrangement direction of the liquid crystal molecules after applying voltage to the liquid crystal cell shown in FIG. 1.

The detailed descriptions accompanying drawings and the embodiment of the present invention are as follows.

The present invention provides an alignment film material used for liquid crystal display panel. The alignment film material comprises a solvent and a substance dissolved in the solvent. The substance comprises at least one first polymer. The first polymer comprises a main chain and a side chain connected to the main chain. Part of the side chain comprises an alkyl group with a predetermined length. The end of the alkyl group comprises a cyclohexenyl group. The para- or meta-position of the cyclohexenyl group comprises a sterically hindered functional group, so that the side chain has the property of forming stable vertical alignment In the vertical alignment display mode of the liquid crystal display panel, the alignment film is one of the essential components to control the angel between the liquid crystal molecules and the substrate. The first polymer of the alignment film material according to the present invention comprises a main chain and a side chain. The side chain is connected to the main chain. The characteristic of the side chain is containing an alkyl group with a predetermined length. The end of the alkyl group comprises a cyclohexenyl group. The para- or meta-position of the cyclohexenyl group comprises a sterically hindered functional group. These structural characteristics allow the side chain having the property of forming stable vertical alignment.

Steric hindrance mainly refers to the tension within molecules resulted from space obstruction and deviated bond angle due to certain atoms or groups in the molecules close to each other.

The predetermined length of the alkyl group refers to alkyl group with a certain number of carbon atoms. The predetermined length depends on the actual application or be determined by experiment. If the steric hindrance of the entire group at the end of the alkyl group comprising a cyclohexenyl group is large, the number of carbon atoms of the alkyl group can be less. If the steric hindrance of the entire group at the end of the alkyl group comprising a cyclohexenyl group is not very large, the number of carbon atoms of the alkyl group can be more. In summary, the number of carbon atoms of the alkyl group is negatively correlated to the steric hindrance of the entire group at the end of the alkyl group comprising a cyclohexenyl group. It is adjusted depending on the actual application, the ultimate basis is to allow the side chain having the property of forming stable vertical alignment, that is, the side chain has the ability to make the liquid crystal molecules vertically oriented relative to the substrate. As long as it has this ability, the number of carbon atoms of the alkyl group and the magnitude of the steric hindrance of the entire group at the end of the alkyl group comprising a cyclohexenyl group can adjust each other. According to the test results of the alignment film material, if the side chain has a certain length, and the end of the side chain has a larger group, the side chain will have the property of forming stable vertical alignment; if the group at the end of the side chain is small, the side chain will not have the property of forming stable vertical alignment.

It should be noted that the substance dissolved in the solvent either comprises one first polymer satisfying the condition, or comprises two or more first polymers satisfying the condition. The condition is comprising a main chain and a side chain connected to the main chain, part of the side chain comprising an alkyl group with a predetermined length, the end of the alkyl group comprising a cyclohexenyl group, and the para- or meta-position of the cyclohexenyl group comprising a sterically hindered functional group.

The sterically hindered functional group includes, but not limited to, alkyl group, aryl group and heterocyclic ring. For example, the alkyl group can be tert-butyl group, cyclohexane, etc.; the aryl group refers to any functional group or substituent derived from a simple aromatic ring, the aryl group can be benzene ring, naphthalene ring, etc.; the heterocyclic ring refers to a ring structure composed of carbon atoms and non-carbon atoms, the heterocyclic ring can be pyridine, quinoline, phenothiazines, benzodiazepines, furans, pyrazolone, pyrimidine, etc.

The main chain of the first polymer can be a second polymer, which is polyimide or polyimide acid. Also, the substance dissolved in the solvent is the first polymer with polyimide or polyimide acid as the main chain. Polyimide or polyimide acid refer to a class of polymers with main chain comprising imide ring (—CO—N—CO—). Polyimide is a special engineering material, which has been widely used in aviation, aerospace, microelectronics, nanotechnology, liquid crystals, membranes, laser and other fields. Polyimide is divided into condensation type aromatic polyimide and addition type polyimide. Condensation type aromatic polyimide is obtained from aromatic diamine reacting with aromatic dianhydride, aromatic tetracarboxylic acid or aromatic tetracarboxylic acid dialkyl ester. For example, the main chain is a third polymer, the third polymer is a polymer composed of 3,4'-dicarboxy-4,3' amide biphenyl and 3,4,3',4-biphenyl tetracarboxylic.

Wherein, the solvent of the alignment film material is selected from the group consisting of N-methyl pyrrolidone (NMP) and diethylene glycol monobutyl ether (BC). Other high-boiling aprotic solvents may also be used, which is not limited.

The following specific example illustrates the substance dissolved in the solvent of the alignment film material. For example, the substance is the first polymer in the following formula (1):

formula (1):

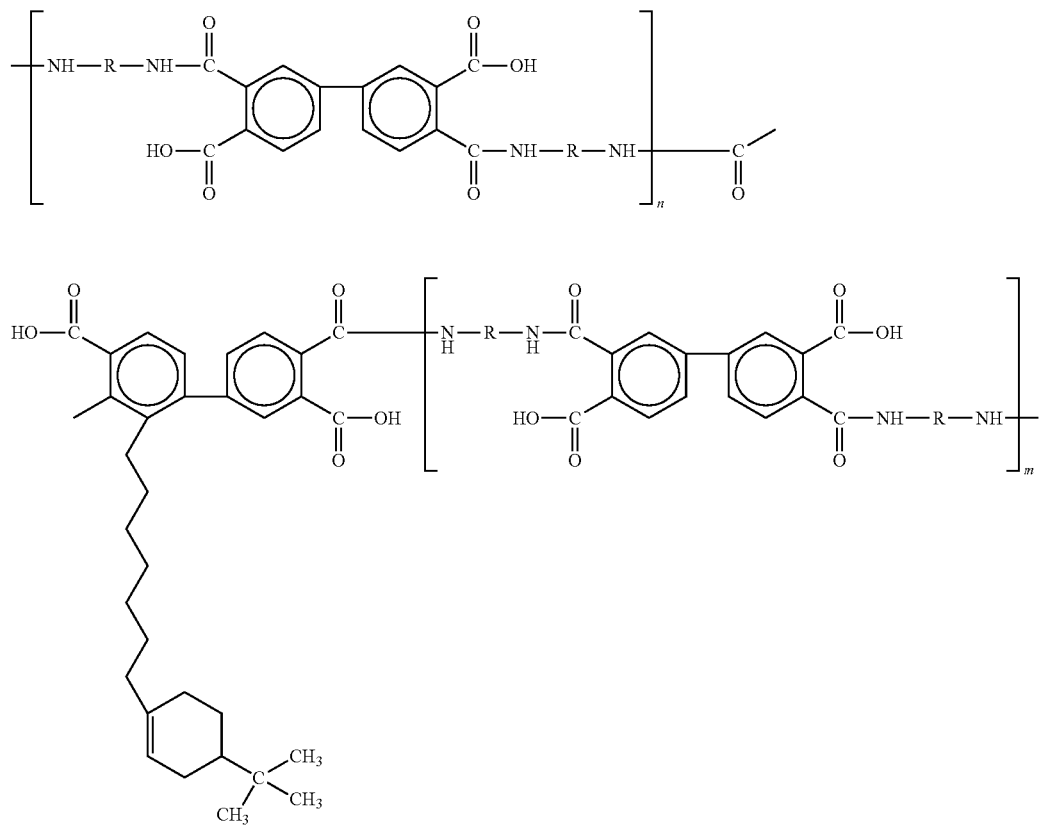

In formula (1), the main chain is the polymer composed of 3,4'-dicarboxy-4,3' amide biphenyl and 3,4,3',4'-biphenyl tetracarboxylic, the side chain comprises alkyl group with 7 carbon atoms, the end of the alkyl group is cyclohexenyl group, and the para-position of the cyclohexenyl group is tert-butyl group. Formula (1) is a repeating unit, the actual material is the main body material composed of multiple formula (1) repeating units. The host material is mixed with NMP or BC or a mixture of NMP and BC in a certain proportion, which the alignment film material according to the present invention is prepared.

For example, the substance dissolved in the solvent can be another first polymer, the another first polymer is the polymer shown in the following formula (2):

formula (2):

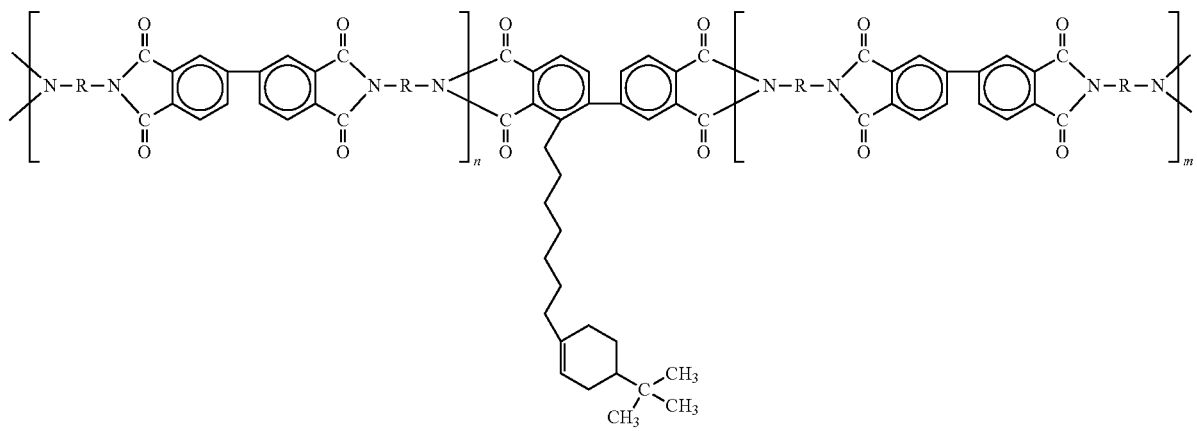

The side chains of the formula (2) and the formula (1) are the same, the different is that the main chain of the formula (2) is obtained from the amidation reaction of formula (1).

For example, the substance dissolved in the solvent can be the fi polymer shown in the following formula (3):

formula (3):

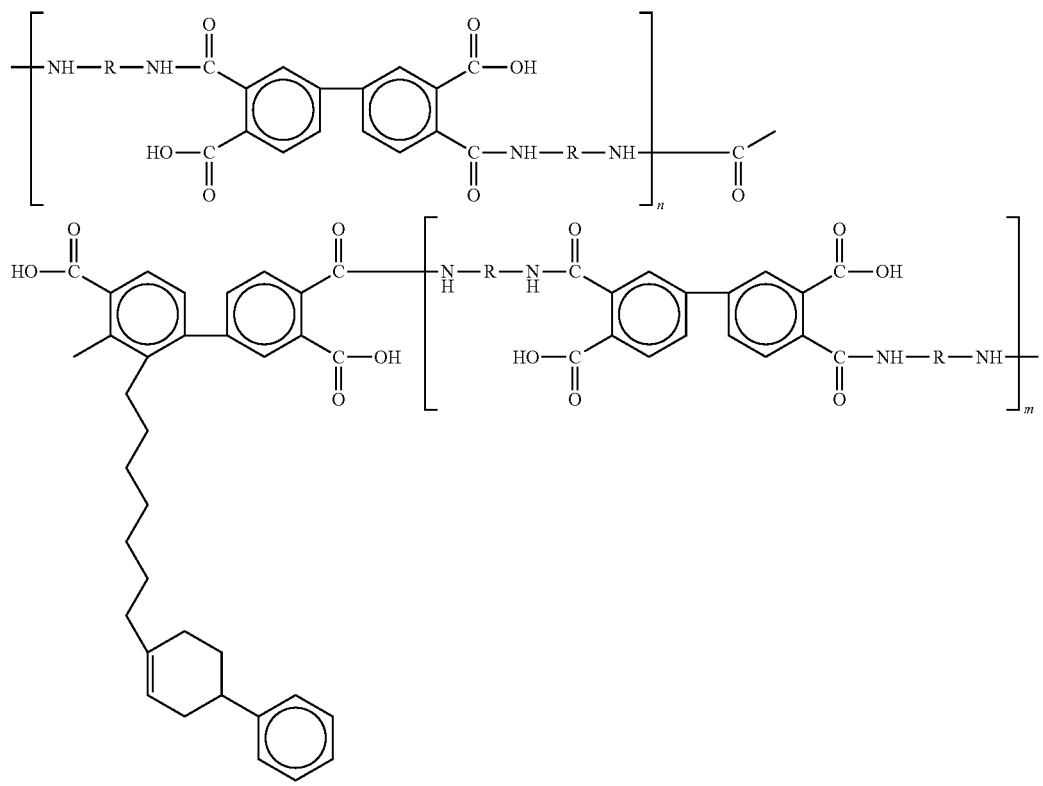

The main chains of the formula (3) and the formula (1) are the same, the different is that the para-position of the cyclohexenyl group at the end of the side chain of the formula (3) is phenyl group.

It should be noted that the substance dissolved in the solvent can be the mixture of the above first polymers, such as the mixture of the formula (1) and the formula (2), the mixture of the formula (1) and the formula (3), etc.

In summary, the alignment film material used for liquid crystal display panel according to the present invention comprises the solvent and the substance dissolved in a solvent. The substance comprises at least one first polymer, the first polymer comprises the main chain and the side chain connected to the main chain, part of the side chain comprises the alkyl group with a predetermined length, the end of the alkyl group comprises a cyclohexenyl group, the para- or meta-position of the cyclohexenyl group comprising the sterically hindered functional group, so that the side chain has the property of forming stable vertical alignment. Therefore, when using the alignment film material according to the present invention, only the alignment film is required to allow the liquid crystal molecules forming stable vertical alignment. Comparing with the prior art, the reactive monomer is not needed to add, which can avoid the mura defects from the reactive monomer. At the same time, the side chain acts as the following reactive group and be fixed on the main chain of the alignment film. The concentration of the reactive group will not become uneven due to reaction. Therefore, it can reduce the generation of the small bright dots and improve the display quality of the products.

Referring to FIG. 1, the manufacturing method for liquid crystal display panel according to an embodiment of the present invention, comprising:

Step S101: preparing a first substrate, a second substrate and a liquid crystal, at least one of the first substrate and the second substrate being provided with an alignment film, the material of the alignment film comprising a solvent and a substance dissolved in the solvent, the substance comprising at least one first polymer, the first polymer comprising a main chain and a side chain connected to the main chain, part of the side chain comprising an alkyl group with a predetermined length, the end of the alkyl group comprising a cyclohexenyl group, the pare- or meta-position of the cyclohexenyl group comprising a sterically hindered functional group, so that the side chain has the property of forming stable vertical alignment.

In the production process of the liquid crystal display panel, prepare a first substrate and a second substrate firstly. Wherein, the first substrate can be the array substrate required for the liquid crystal display panel, and the second substrate can be the color filter substrate required for the liquid crystal display panel. After cleaning the two substrates, coat the alignment film on one surface of the first substrate and one surface of the second substrate. The coating of the alignment film can utilize APR coating method, which transfers the alignment film pattern onto the first substrate and the second substrate using APR printing plate. In the other embodiments, Ink-Jet method can also be utilized to coat the alignment film.

Wherein, the material of the alignment film is the substance dissolved in the solvent. The substance comprises at least one first polymer, and the first polymer is the polymer having the property of forming stable vertical alignment. The first polymer comprises a main chain and a side chain connected to the main chain. The characteristic of the side chain is containing an alkyl group with a predetermined length. The end of the alkyl group comprises a cyclohexenyl group. The pare- or meta-position of the cyclohexenyl group comprises a sterically hindered functional group. These structural characteristics allow the side chain having the property of forming stable vertical alignment.

The predetermined length of the alkyl group refers to alkyl group with a certain number of carbon atoms. The predetermined length depends on the actual application or be determined by experiment. If the steric hindrance of the entire group at the end of the alkyl group comprising a cyclohexenyl group is large, the number of carbon atoms of the alkyl group can be less. If the steric hindrance of the entire group at the end of the alkyl group comprising a cyclohexenyl group is not very large, the number of carbon atoms of the alkyl group can be more. In summary, the number of carbon atoms of the alkyl group is negatively correlated to the steric hindrance of the entire group at the end of the alkyl group comprising a cyclohexenyl group. It is adjusted depending on the actual application, the ultimate basis is to allow the side chain having the property of forming stable vertical alignment, that is, the side chain has the ability to make the liquid crystal molecules vertically oriented relative to the substrate. As long as it has this ability, the number of carbon atoms of the alkyl group and the magnitude of the steric hindrance of the entire group at the end of the alkyl group comprising a cyclohexenyl group can adjust each other. According to the test results of the alignment film material, if the side chain has a certain length, and the end of the side chain has a larger group, the side chain will have the property of forming stable vertical alignment; if the group at the end of the side chain having the property of forming stable vertical alignment after treatment, such as UV irradiation, is small, the side chain will not have the property of forming vertical alignment.

It should be noted that the substance dissolved in the solvent either comprises one first polymer satisfying the condition, or comprises two or more first polymers satisfying the condition. The condition is comprising a main chain and a side chain connected to the main chain, part of the side chain comprising an alkyl group with a predetermined length, the end of the alkyl group comprising a cyclohexenyl group, and the para- or meta-position of the cyclohexenyl group comprising a sterically hindered functional group.

Specifically, the sterically hindered functional group includes, but not limited to, alkyl group, aryl group and heterocyclic ring. For example, the alkyl group can be tert-butyl group, cyclohexane, etc.; the aryl group refers to any functional group or substituent derived from a simple aromatic ring, the aryl group can be benzene ring, naphthalene ring, etc.; the heterocyclic ring refers to a ring structure composed of carbon atoms and non-carbon atoms, the heterocyclic ring can be pyridine, quinoline, phenothiazines, benzodiazepines, furans, pyrazolone, pyrimidine, etc.

The main chain of the first polymer can be a second polymer, which is polyimide or polyimide acid. Also, the substance dissolved in the solvent is the first polymer with polyimide or polyimide acid as the main chain. Polyimide or polyimide acid refer to a class of polymers with main chain comprising imide ring (—CO—N—CO—). Polyimide is a special engineering material, which has been widely used in aviation, aerospace, microelectronics, nanotechnology, crystals, membranes, laser and other fields. Polyimide is divided into condensation type aromatic polyimide and addition type polyimide. Condensation type aromatic polyimide is obtained from aromatic diamine reacting with aromatic dianhydride, aromatic tetracarboxylic acid or aromatic tetracarboxylic acid dialkyl ester. For example, the main chain is a third polymer, the third polymer is a polymer composed of 3,4'-dicarboxy-4,3' amide biphenyl and 3,4,3',4'-biphenyl tetracarboxylic.

The first polymer according to the present embodiment can be the polymer shown in the following formula (4):

In formula (4), the main chain is the polymer composed of 3,4'-dicarboxy-4,3' amide biphenyl and 3,4,3',4'-biphenyl tetracarboxylic. The side chain is connected to the main chain, which comprises the alkyl group with 7 carbon atoms, the end of the alkyl group comprising a cyclohexenyl group, and the para-position of the cyclohexenyl group is tert-butyl group. The characteristic of the side chain is the length of the alkyl group has the predetermined length, and the para- or meta-position of the cyclohexenyl group comprises the tert-butyl group with larger steric hindrance, so that the side chain has the property of forming stable vertical alignment, which controls the liquid crystal molecules under the state of stable vertical alignment. Formula (4) is a repeating unit, the actual material is the host material composed of multiple formula (4) repeating units. The host material is mixed with N-methylpyrrolidone (NMP) in a certain proportion to obtain the alignment film material. In the other embodiments, the solvent of the alignment film material can be diethylene glycol monobutyl ether (BC) or the mixture of NMP or BC. Other high-boiling aprotic solvents may also be used, which is not limited.

After the coating step of the alignment film material, cure the alignment film material. During curing, the main chain of the formula (4) meets amidation, the carboxyl group and amino groups are transformed to amide, which becomes the polymer shown in the following formula (5):

formula (4):

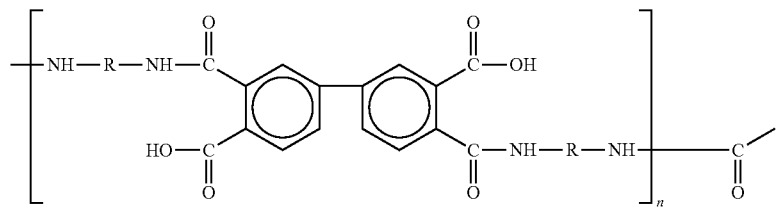

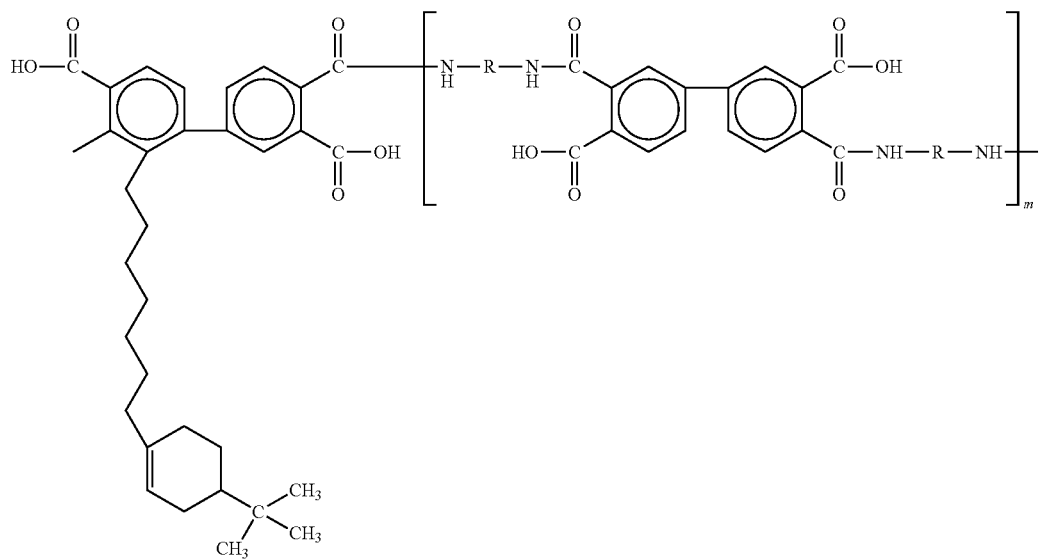

formula (5):

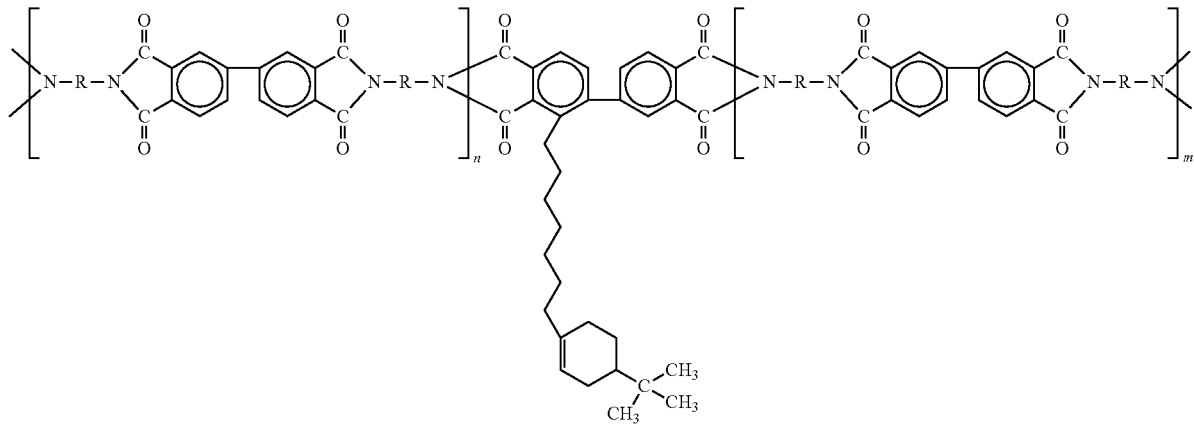

Wherein, the curing temperature and curing time is adjusted basing on the molecular weight of the polymer (4). In order to protect the cyclohexenyl group, it prefers lower temperature and shorter time. During curing, nitrogen is needed to isolate the influence of oxygen. After that, cool the alignment film to room temperature under nitrogen atmosphere.

Step S102: folding the first substrate and the second substrate, and injecting the liquid crystal between the first substrate and the second substrate to form a liquid crystal cell, the alignment film being provided adjacent to the liquid crystal, the side chain having the property of forming stable vertical alignment, so that the liquid crystal molecules of the liquid crystal is under the state of vertical alignment.

After the treatment for the alignment film, fold the first substrate and the second substrate and coat the sealant, so that the first substrate and the second substrate are laminated.

Moreover, reserve a liquid crystal injection port, inject the required liquid crystal from the injection port, and form the liquid crystal cell. Wherein, the surface coated with the alignment film of the first substrate faces the liquid crystal, so that the alignment film is provided adjacent to the liquid crystal. The used liquid crystal is negative liquid crystal material. At this time, because the side chain has the property of forming stable vertical alignment, the liquid crystal molecules are under the state of vertical alignment under the effects of the side chain.

Step S103: applying voltage to the liquid crystal cell, and then irradiating the liquid crystal cell with UV light, so that the liquid crystal molecules of the liquid crystal become predetermined orientation from vertical alignment.

After forming liquid crystal cell, apply photo-alignment to the liquid crystal. First, apply voltage to the first substrate and the second substrate of the liquid crystal cell, so that the liquid crystal molecules have a certain orientation. For example, control the liquid crystal molecules to form stable orientation according to the 4 domains pattern shown in FIG. 2. After that, continuously apply voltage, and irradiate the liquid crystal cell with UV light. The wavelength of the UV light is larger than 310 nm. Under the UV irradiation, the cyclohexenyl group at end of side chain in the formula (5) is under the reverse reaction of 4+2 cyclization reaction and is degraded to form the polymer shown in the following formula (6):

formula (6)

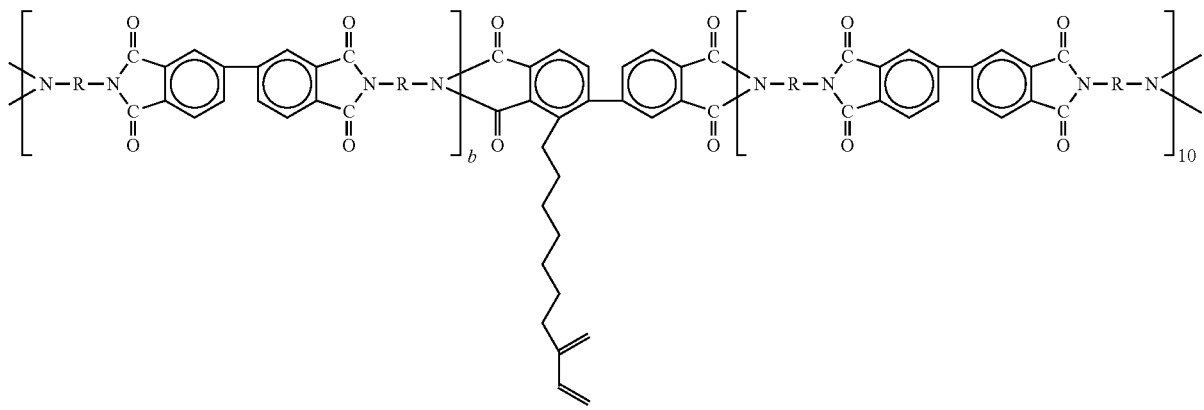

In the formula (6), the main chain is the same as that in formula (5). The difference is that the end of the side chain is conjugated diene functional group. Comparing the formula (5) with the formula (6), the conjugated diene functional group at the end of the side chain of the formula (6) is smaller than the cyclohexenyl group at end of side chain in the formula (5), so that the steric hindrance of the functional group at end of side chain is changed. The steric hindrance of the conjugated diene functional group is much smaller than the tert-butyl group. These structures make the side chain no longer having the property of forming stable vertical alignment, so that the liquid crystal molecules are changed from the state of vertical alignment to predetermined alignment under the combined action of the applied voltage and the side chain. By adjusting the voltage applied to the crystal liquid cell and the size of the functional group at the end of the side chain, the pretilt angle of the liquid crystal molecules can be controlled between 88 to 90 degrees.

After the photo-alignment process, stop irradiating the UV light, and then stop applying voltage to the liquid crystal cell. At this time, because the side chain of the alignment film no longer having the property of forming stable vertical alignment, the liquid crystal molecules can not be restored to the previous state of vertical alignment, but having a certain pretilt angle instead. That is, it is under the state of predetermined alignment.

Because the reactive center is fixed on the main chain of the alignment film material according to the present embodiment, and the ordinary liquid crystal materials are utilized, the proliferation of the reactive monomer won't exist. At the same time, because the reactive group is fixed on the main chain of the alignment film, the concentration of the reactive group will not become uneven due to the reaction, which can reduce low contrast and uneven brightness of the products, and then reduce the mura phenomenon in the liquid crystal display panel and improve the display quality.

In the other embodiments, the substance dissolved in the solvent of the alignment film material can also be the first polymer shown in the following formula (7):

The main chains of the formula (7) and the formula (4) are the same. The difference is that the para-position of the cyclohexenyl group at the end side of the formula (7) is phenyl group.

Moreover, in the other embodiments, the substance dissolved in the solvent of the alignment film material can also be the polymer shown in the formula (5), of course, it can also be the mixture of the above first polymers, such as the mixture of the formula (4) and the formula (5), the mixture of the formula (4) and the formula (7), etc.

The preferred embodiments according to the present invention are mentioned above, which cannot be used to define the scope of the right of the present invention. Those variations of equivalent structure or equivalent process according to the present specification and the drawings or directly or indirectly applied in other areas of technology are considered encompassed in the scope of protection defined by the claims of the present invention.

What is claimed is:

1. An alignment film material used for liquid crystal display panel, wherein, the alignment film material comprises a solvent and a substance dissolved in the solvent; the substance comprising at least one first polymer, the first polymer comprising a main chain and a side chain connected to the main chain, part of the side chain comprising an alkyl group with a predetermined length, the end of the alkyl group comprising a cyclohexenyl group, the para- or meta-position of the cyclohexenyl group comprising a sterically hindered functional group, so that the side chain has the property of forming stable vertical alignment, the sterically hindered functional group being selected from alkyl group, aryl group and heterocyclic ring, the main chain being a second polymer, formula (7):

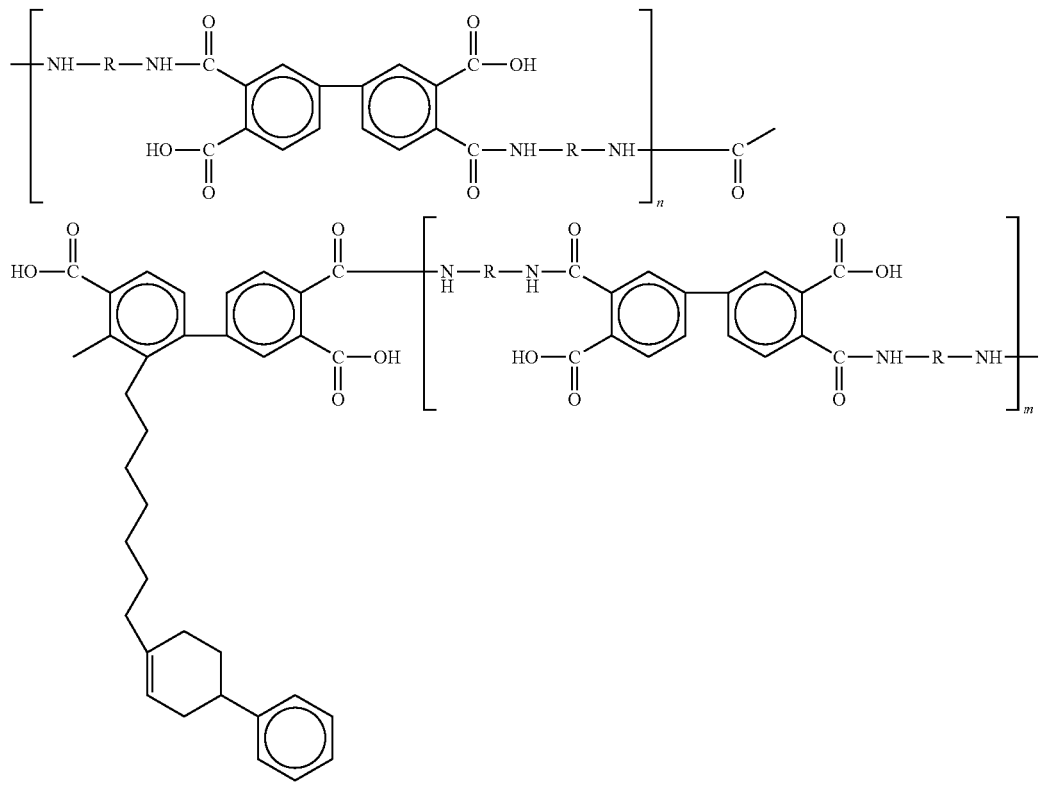

the second polymer being selected from polyimide and polyimide acid, the solvent being selected from the group consisting of n-methyl pyrrolidone and diethylene glycol monobutyl ether.

2. The alignment film material as claimed in claim 1, wherein the alkyl group is selected from t-butyl group and cyclohexane, the aryl group is phenyl ring.

3. The alignment film material as claimed in claim wherein the main chain is a third polymer, the third polymer is a polymer composed of 3,4'-dicarboxy-4,3' amide biphenyl and 3,4,3',4'-biphenyl tetracarboxylic.

4. An alignment film material used for liquid crystal display panel, wherein, the alignment film material comprises a solvent and a substance dissolved in the solvent; the substance comprising at least one first polymer, the first polymer comprising a main chain and a side chain connected to the main chain, part of the side chain comprising an alkyl group with a predetermined length, the end of the alkyl group comprising a cyclohexenyl group, the para- or meta-position of the cyclohexenyl group comprising a sterically hindered functional group, so that the side chain has the property of forming stable vertical alignment.

5. The alignment film material as claimed in claim 4, wherein the sterically hindered functional group is selected from alkyl group, aryl group and heterocyclic ring.

6. The alignment film material as claimed in claim 5, wherein the alkyl group is selected from t-butyl group and cyclohexane, the aryl group is phenyl ring.

7. The alignment film material as claimed in claim 4, wherein the main chain is a second polymer, the second polymer is selected from polyimide and polyimide acid.

8. The alignment film material as claimed in claim 7, wherein the main chain is a third polymer, the third polymer is a polymer composed of 3,4'-dicarboxy-4,3' amide biphenyl and 3,4,3',4'-biphenyl tetracarboxylic.

9. The alignment film material as claimed in claim 4, wherein the solvent is selected from the group consisting of N-methyl pyrrolidone and diethylene glycol monobutyl ether.

10. An manufacturing method for liquid crystal display panel, comprising:

preparing a first substrate, a second substrate and a liquid crystal, at least one of the first substrate and the second substrate being provided with an alignment film, the material of the alignment film comprising a solvent and a substance dissolved in the solvent, the substance comprising at least one first polymer, the first polymer comprising a main chain and a side chain connected to the main chain, part of the side chain comprising an alkyl group with a predetermined length, the end of the alkyl group comprising a cyclohexenyl group, the para- or meta-position of the cyclohexenyl group comprising a sterically hindered functional group, so that the side chain has the property of forming stable vertical alignment;

folding the first substrate and the second substrate, and injecting the liquid crystal between the first substrate and the second substrate to form a liquid crystal cell, the alignment film being provided adjacent to the liquid crystal, the side chain having the property of forming stable vertical alignment, so that the liquid crystal molecules of the liquid crystal is under the state of vertical alignment;

applying voltage to the liquid crystal cell, and then irradiating the liquid crystal cell with UV light, so that the liquid crystal molecules of the liquid crystal become predetermined orientation from vertical alignment.

11. The method as claimed in claim 10, wherein the sterically hindered functional group is selected from alkyl group, aryl group and heterocyclic ring.

12. The method as claimed in claim 11, wherein the alkyl group is selected from t-butyl group and cyclohexane, the aryl group is phenyl ring.

13. The method as claimed in claim 10, wherein the main chain is a second polymer, the second polymer is selected from polyimide and polyimide acid.

14. The method as claimed in claim 13, wherein the main chain is a third polymer, the third polymer is a polymer composed of 3,4-dicarboxy-4,3' amide biphenyl and 3,4,3',4'-biphenyl tetracarboxylic.

15. The method as claimed in claim 10, wherein the solvent is selected from the group consisting of N-methyl pyrrolidone and diethylene glycol monobutyl ether.

* * * * *